Sept. 29, 1970   M. GOULD   3,531,370
COLOR REMOVAL FROM WASTE EFFLUENTS
Filed Nov. 4, 1968
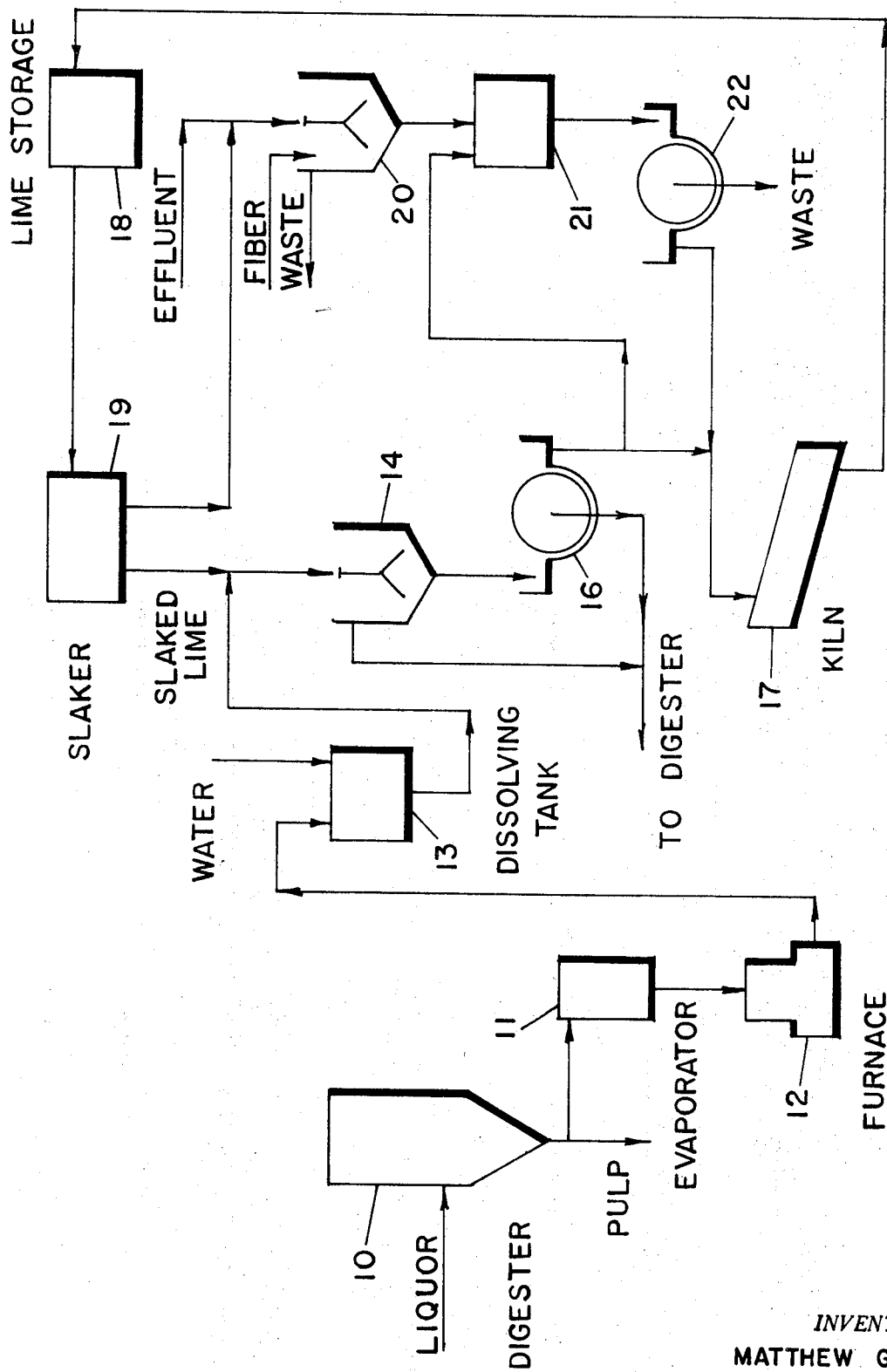
INVENTOR.
MATTHEW GOULD
BY
Peter P. Chivo
ATTORNEY United States Patent Office 3,531,370
Patented Sept. 29, 1970

3,531,370
COLOR REMOVAL FROM WASTE EFFLUENTS
Matthew Gould, Portland, Oreg., assignor to Georgia-Pacific Corporation, Portland, Oreg., a corporation of Georgia
Filed Nov. 4, 1968, Ser. No. 772,908
Int. Cl. D21c 11/12
U.S. Cl. 162—33       8 Claims

ABSTRACT OF THE DISCLOSURE

A process for removing color bodies from kraft pulping process waste effluents by precipitating the color bodies with lime and calcining the product to recover the lime values and burn the color bodies.

---

This invention pertains to a process for removing color from kraft pulping process waste effluents.

Color imparted to surface waters by pulping effluents has been a major problem in the pulping industry. In recent years the significance of this problem has increased greatly due to the emphasis placed on stream pollution abatement. The presence of color bodies is aesthetically objectionable, especially where the effluent is discharged into streams or a body of water which may be used as a source of water supply or for recreational purposes.

Considerable effort has been expended by the pulping industry to develop methods for color removal. It is known that the addition of hydrated lime to the effluent will result in precipitation of the color bodies. The precipitate obtained, however, is gelatinous in nature, low in solids content, difficult to separate, and extremely resistant to dewatering by accepted methods. The sludge or precipitate presents a disposal problem, if it cannot be dewatered and processed, such as by calcining or burning in a kiln, to recover the chemical or calcium values. A dewaterable sludge may be obtained by the addition of a large excess of lime, for example in the range of 10,000 parts to 30,000 parts of lime per million parts of effluent. However, a large amount of lime is lost making the process impractical.

It is, therefore, an object of this invention to provide a process for the removal of organic color bodies from kraft process effluents by the use of relatively small amounts of lime. A further object is to provide a process for the removal of color bodies characterized by dewatering a lime precipitate of the color bodies obtained by using relatively small amounts of lime and calcining the product to recover the calcium values and burn the color bodies. A still further object is to provide an improved pulping process and an economical process for the removal of color from kraft process effluents which may be readily integrated into the pulping process.

The above and other objects are attained, according to this invention, by treating the kraft process waste effluent with from 500 to 2500 parts by weight of lime per million parts of effluent at a pH of at least 11.3, preferably at least 11.5. The organic color bodies are precipitated with the lime in the presence of a small amount of cellulosic fiber to obtain effective settling of the lime-organic color bodies precipitated. The precipitate is intermixed with lime mud filter cake or calcium carbonate until a slurry containing at least 22 weight percent of solids is obtained. The solids are recovered from the slurry by filtration and calcined to convert the calcium values to calcium oxide for reuse in the kraft process. By the addition of cellulosic fiber to the effluent, a relatively rapid settling of the precipitate is obtained. The precipitate, when intermixed with lime mud filter cake or calcium carbonate to the particular solids concentration, is a readily filterable product which can be dewatered and then burned in a kiln to recover the calcium values.

The attached figure schematically illustrates a kraft pulping process incorporating one embodiment of the color removal process. As shown in the figure, wood is digested in digester 10 with a digestion liquor consisting mainly of sodium hydroxide and sodium sulfide. Upon digestion of the wood, a pulp is obtained which consists mainly of the cellulose constituents of the wood. The pulp also contains noncellulosic constituents, such as lignins and tannins, which are mainly responsible for the color in the pulp. The major portion of the noncellulosic constituents of the wood is dissolved in the spent digestion liquor which is commonly referred to as "black liquor." The black liquor is generally processed to recover the chemical values by evaporating the black liquor in evaporator 11 and burning the concentrated liquor in furnace 12 to obtain a smelt of sodium carbonate and sodium sulfide. The smelt is dissolved in water in dissolving tank 13 to obtain a solution of sodium salts which is called "green liquor." The green liquor, after clarification, is causticized with lime converting the sodium carbonate in the green liquor to sodium hydroxide. The causticized liquor, referred to as "white liquor," is clarified in clarifier 14 and returned to the digester to be used in the preparation of fresh digestion liquor. The underflow from clarifier 14, consisting mainly of calcium carbonate and commonly called "lime mud," is filtered in filter 16. The filtrate from filter 16 is likewise returned to the digester. The lime mud or calcium carbonate filter cake is calcined in kiln 17 and the resulting calcium oxide discharged to lime storage 18. It is then used for causticizing of additional green liquor after being slaked in slaker 19.

The color removal process is incorporated into the kraft pulping process, as shown in the figure, by the addition of clarifier 20, mixing tank 21, and filter 22. In the operation of the process, the effluent, which can be alkaline bleach waste effluent or other colored effluents from the kraft process, such as washings or black liquor containing effluents, is discharged into clarifier 20. A portion of slaked lime from slaker 19 is intermixed with the effluent in an in-line mixer. Generally, the effluent streams are treated at the temperature at which they are available. Some improvement in the settling and filtering rates may be obtained at higher temperatures, for example 180° to 210° F., but the temperature is not critical unless unslaked lime is used. If the lime treatment of the effluent is combined with the slaking operation, temperature control may be desirable for the slaking reaction.

In clarifier 20, generally, cellulosic fiber, such as a suspension of unbleached pulp, is intermixed with the lime-treated effluent in a small amount to aid in the settling and dewatering. Usually, an amount of from 20 to 200 parts, most often from 30 to 50 parts by weight of fiber per million parts of effluent is added. At times, an effluent may contain a sufficient amount of fiber so that further additions may not be necessary. For example, a bleach effluent may be used in the wood room or woodyard prior to treatment for color removal. In such a use the effluent may pick up more than 20 parts per million of fiber. However, the addition may still be continued, since it may be more conveniently made than determining periodically the fiber content of the effluent.

Clarifier 20 is operated under conditions normally employed for such equipment and a retention time of as little as two hours may be used. The overflow, with about 70 to 95 percent of the color bodies removed and a biochemical oxygen demand decreased by from 20 to 55 percent, is generally discharged to waste. The underflow or sludge usually contains from 2 to 10 weight percent solids but may be higher under certain conditions. It is discharged to mixing tank 21. The sludge from the clarifier may be recycled; however, very little apparent benefit is realized by the recycling or aging of the sludge. Also, a thickener may be employed to further increase the solids concentration, if desired.

The underflow or sludge from the clarifier is intermixed in mixing tank 21 with a portion of the lime mud filter cake from filter 16. A sufficient amount of the lime mud filter cake is added to increase the solids content of the sludge to at least 22 weight percent, preferably in the range of 24 to 35 percent solids. Larger amounts of the filter cake may also be added with the limiting factor being the disadvantage of handling the larger amounts. While the filter cake is shown in the figure as being added to mixing tank 21, part of the lime mud cake may be intermixed with the sludge in clarifier 20. Also in place of the filter cake, calcium carbonate from other sources in fine particulate form, for example, of about the same particle size as that obtained upon the precipitation of lime mud may be used.

The sludge or slurry containing the lime mud solids is then discharged to filter 22 where the lime mud solids and the lime-organic color bodies precipitate are removed. The filtrate obtained when a lime mud filter cake is so used is generally discharged to waste, since it contains substantially no sodium values. The filter cake having a solids content off rom 50 to 65 percent is calcined with the remainder of the lime mud in kiln 17 where the color bodies are burned.

In intermixing the lime with the effluent to precipitate the color bodies, generally from 500 to 2500 parts by weight of lime per million parts of effluent are added with from 800 to 1500 parts per million being preferred. It is essential that the pH of the effluent, after treatment with lime, be at a pH of at least 11.3, preferably at least 11.5. With some bleach waste effluent, the pH of the effluent as obtained may be above 11.3. However, for effluents at a low pH, it may be necessary to increase the pH of the effluent in order to obtain the final pH at the desired level. This may be done by the addition of more lime but other alkaline agents such as alkali metal or ammonium hydroxide or other alkaline earth metal hydroxides may be used. When the effluent is alkalinized with lime, the amount of lime added may be increased above 2500 parts per million of effluent to account for the alkalinization.

While the color removal process is used mainly for the treatment of alkaline kraft bleach waste effluents, it is effective for color removal from other kraft effluents and sources of color in the kraft process. An alkaline kraft bleach effluent is the main source of color. In the bleaching process, the pulp is contacted with a chlorinating agent, such as chlorine, chlorine dioxide, hypochlorite, or other chlorinating or bleaching agents. The lignin, tannin and other color imparting constituents in the pulp are chlorinated or reacted with the bleaching agent and are then removed from the pulp by washing the pulp with an alkali such as caustic soda. Several additional stages may be used, but the caustic wash effluent obtained is highly colored and may be responsible for as much as 80 percent of the total color discharged in the kraft pulping process effluents.

When the alkaline bleach effluent is not discharged directly to waste but is used, for example, in woodyards or barking rooms prior to discharge and color removal, the effluent may pick up, in addition to fiber, additional amounts of tannin and other bark constituents. These bark constituents are removed along with the lime precipitate of the organic color bodies.

To illustrate the invention, a caustic bleach effluent from the bleaching of kraft pulp was treated to remove the organic color bodies. The caustic bleach effluent was used in the woodyard prior to treatment and had a color content of 4000 units or parts of color per million parts of effluent and a B.O.D. of 153 parts per million parts of effluent. The color content was determined by the platinum-cobalt method set forth in the 12th edition of "Standard Methods for the Examination of Water and Wastewater."

To 50 gallons of the effluent, a slurry of unbleached kraft pulp was added in an amount to obtain about 30 parts of fiber per million parts of effluent. With this mixture, 2000 parts of freshly slaked lime per million parts of effluent were intermixed to precepitate the color bodies. After settling for one hour, the supernatant liquor obtained by decantation had a color content of 700 parts and a B.O.D. of 86 parts per million. The pH of the effluent prior to and after the lime treatment was 9.1 and 12.2 respectively.

The sludge obtained, comprising 9 percent by volume of the treated effluent, contained 2.9 percent solids by weight. It was intermixed with a lime mud filter cake containing 66 weight percent solids which was obtained from the kraft pulping process. Sufficient amount of the lime mud filter cake was added to obtain a slurry containing 25 weight percent solids. The resulting slurry was filtered on a standard filter leaf. The results obtained are shown in the table below:

|  | Run Number | | |
|---|---|---|---|
|  | 1 | 2 | 3 |
| Vacuum, inches | 25 | 25 | 20 |
| Form time, seconds | 10 | 20 | 25 |
| Drying time, seconds | 20 | 20 | 20 |
| Cake thickness, inches | 3/16 | 1/4 | 1/4 |
| Cake weight, grams O.D. | 41.5 | 56.3 | 52.2 |
| Percent solids of wet cake | 57 | 57 | 62 |
| Filter rate, lbs./sq. ft./hr | 110 | 112 | 92 |

When the sludge is intermixed with the lime mud filter cake in an amount to obtain a slurry of about 20 percent solids, the filter rate is decreased to about 9 to 14 pounds per square foot per hour.

A sample of the filter cake from Run 2 above was calcined to convert the lime and calcium carbonate to calcium oxide. The ignition product, obtained in an amount of 58.1 weight percent of the original sample, contained 1.5 weight percent of sodium and 0.01 percent silica as silicon dioxide. Upon calcining the lime mud filter cake alone, 58.6 percent of the original sample was obtained as the ignition product which contained 1.9 weight percent sodium and 0.01 percent silica as silicon dioxide.

The amount and percentage of color bodies removed and the B.O.D. reduction obtained by the treatment will vary somewhat depending on the source of the particular effluent and the concentration of color bodies and B.O.D. at the time of treatment. A caustic bleach effluent directly from the bleaching plant at a pH of 10.3 and containing 12,000 parts per million of color and 1170 parts per million of B.O.D. was treated with 2000 parts per million of lime and 50 parts per million of unbleached kraft fiber. The treated effluent at a pH of 11.9 was allowed to settle for 45 minutes and then separated into a sludge and a supernatant liquor. The sludge, comprising 2.5 volume percent of the sample, contained 8.5 percent solids by weight. The supernatant liquor contained 1300 parts per million of color and had a B.O.D. of 618 parts per million. The reductions in color and B.O.D. obtained were 89 percent and 47 percent respectively. Calcination of the sludge yielded a residue containing 0.34 percent silica as silicon dioxide and 0.50 percent chloride.

The above caustic bleach effluent was also used in a wood room where it was diluted about 100 percent with fresh water. Its color content was thus reduced from 12,000 parts per million to 7500 parts per million, and the B.O.D. was reduced from 1170 parts per million to 820 parts per million. Use of the caustic bleach effluent in the wood room increased the suspended solids content from 120 parts per million to 600 parts per million. Treatment with 1500 parts per million of lime and 50 parts per million of unbleached kraft fiber produced an effluent of pH 11.4. The treated effluent was allowed to settle for 45 minutes and then separated into a sludge and a supernatant liquor containing 450 parts per million of color, and 51 parts per million of suspended solids. The B.O.D. was 370 parts per million. The reductions thus obtained were 94 percent, 91 percent, and 55 percent respectively. The sludge, comprising 2.0 volume percent of the treated effluent, contained 10 percent solids by weight. Calcination of the sludge yielded a residue containing 0.50 percent silica as silicon dioxide and 0.15 percent chloride.

What is claimed is:

1. A treatment of a kraft process waste effluent for the removal of the organic color bodies from the waste effluent which comprises treating the effluent with from 500 to 2500 parts by weight of line per million parts of effluent at a pH of at least 11.3 to combine the organic color bodies with the lime to obtain a precipitate in the presence of a sufficient amount of cellulosic fiber to obtain effective settling, settling the fiber-containing, treated effluent to obtain a supernatant liquor with decreased color content and to concentrate the lime-organic color bodies precipitate, discharging said supernatant liquor to waste, adding calcium carbonate in a fine particulate form to the lime-organic color bodies precipitate until a slurry containing at least 22 weight percent of solids is obtained, filtering the slurry to recover the lime-organic color bodies precipitate and the calcium carbonate solids, and calcining the recovered precipitate and calcium carbonate solids to convert the calcium values therein to calcium oxide.

2. A process according to claim 1 wherein the kraft process waste effluent is an alkaline waste bleach effluent treated with lime at a pH of at least 11.5.

3. A process according to claim 2 wherein cellulosic fiber is intermixed in the effluent in an amount of from 20 to 200 parts by weight of cellulosic fiber per million parts of effluent and the calcium carbonate is added until the slurry contains in the range of from 24 to 35 weight percent solids.

4. A process according to claim 3 wherein the effluent is treated with from 800 to 1500 parts by weight of lime per million parts of effluent, and wherein the cellulosic fiber intermixed is from 30 to 50 parts of pulp per million parts of effluent.

5. In a method for the production of bleached wood pulp including the steps of digesting raw wood according to the kraft process and subsequently bleaching said digested wood to thereby produce a bleached pulp and an alkaline bleach waste effluent, said kraft process comprising the steps of digesting the wood with a digestion liquor of sodium hydroxide and sodium sulfide to obtain a wood pulp and a spent digestion liquor, concentrating and burning the spent digestion liquor to obtain a smelt of sodium salts, dissolving the smelt in an aqueous medium to obtain a solution of the sodium salts, causticizing the solution with lime to convert a portion of the sodium values in the solution to sodium hydroxide and obtain a precipitate comprising calcium carbonate, filtering the causticized solution to separate the calcium carbonate precipitate as a line mud and a solution of sodium hydroxide to be used in the process for the preparation of more digestion liquor, calcining the lime mud to convert the lime values in the lime mud to calcium oxide, slaking the calcium oxide to obtain lime to be recycled to the causticizing step above, the improvement of removing color bodies from the alkaline bleach waste effluent which comprises treating the effluent at a pH of at least 11.3 with from 500 to 2500 parts by weight of lime per million parts of effluent to combine the organic color bodies in the effluent with the lime to form a precipitate, intermixing cellulosic fiber into the effluent in sufficient amount to obtain effective settling, settling the fiber-containing, lime treated effluent to obtain a supernatant liquor with decreased color content and to concentrate the lime-organic color bodies precipitate, discharging said supernatant liquor to waste, adding lime mud filter cake to the precipitate until a slurry containing at least 22 weight percent solids is obtained, filtering the slurry to recover the lime-organic color bodies precipitate and the lime mud solids, and calcining the precipitate and the lime mud solids to convert the calcium values to calcium oxide to be recycled to the slaking step of the pulping process above.

6. A process according to claim 5 wherein the effluent is treated with lime at a pH of at least 11.5.

7. A process according to claim 6 wherein the fiber is intermixed in an amount of from 20 to 200 parts by weight per million parts of effluent and the lime mud filter cake is added to the precipitate until a slurry containing from 24 to 35 weight percent solids is obtained.

8. A process according to claim 7 wherein the effluent is treated with from 800 to 1500 parts by weight of lime per million parts of effluent and the fiber intermixed is from 30 to 50 parts of pulp per million parts of effluent.

References Cited

UNITED STATES PATENTS 3,120,464    2/1964    Berger et al. _____ 162—33

FRANK W. MIGA, Primary Examiner

T. G. SCAVONE, Assistant Examiner

U.S. Cl. X.R.

162—38, 45; 210—45

UNITED STATES PATENT OFFICE
CERTIFICATE OF CORRECTION

Patent No. 3,531,370  Dated Sept. 29, 1970

Inventor(s) Matthew Gould

It is certified that error appears in the above-identified patent and that said Letters Patent are hereby corrected as shown below:

Column 5, line 14, the word "line" should read --lime--.
Column 6, line 7, the word "line" should read --lime--.

SIGNED AND
SEALED
JAN 26 1971

(SEAL)
Attest:

Edward M. Fletcher, Jr.
Attesting Officer

WILLIAM E. SCHUYLER, JR.
Commissioner of Patents